United States Patent
Pogrebinsky et al.

(10) Patent No.: US 10,129,344 B2
(45) Date of Patent: Nov. 13, 2018

(54) INTEGRATED USER INTERFACE FOR CONSUMING SERVICES ACROSS DIFFERENT DISTRIBUTED NETWORKS

(71) Applicant: Microsoft Technology Licensing, LLC, Redmond, WA (US)

(72) Inventors: Vladimir Pogrebinsky, Redmond, WA (US); Manish Tandon, Redmond, WA (US); Shriram Natarajan, Bellevue, WA (US); Jiewen Zheng, Issaquah, WA (US); Bradley Bartz, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/264,453

(22) Filed: Sep. 13, 2016

(65) Prior Publication Data

US 2017/0006119 A1    Jan. 5, 2017

Related U.S. Application Data

(63) Continuation-in-part of application No. 14/309,846, filed on Jun. 19, 2014, now Pat. No. 9,560,037.

(51) Int. Cl.
*H04L 29/06* (2006.01)
*H04L 29/08* (2006.01)
(Continued)

(52) U.S. Cl.
CPC ............ *H04L 67/16* (2013.01); *G06F 3/0482* (2013.01); *G06F 9/5072* (2013.01); *G06F 9/541* (2013.01);
(Continued)

(58) Field of Classification Search
CPC ...... G06F 9/5072; G06F 9/541; G06F 3/0482; H04L 67/10; H04L 67/36; H04L 63/0823; H04L 67/16; H04L 67/20; H04L 63/0272
See application file for complete search history.

(56) References Cited

U.S. PATENT DOCUMENTS 8,781,104 B1    7/2014    Allen et al.
8,924,569 B2    12/2014    Li
(Continued)

FOREIGN PATENT DOCUMENTS

CN    105302636 A    2/2016
KR    1020130059593 A    6/2013
(Continued)

OTHER PUBLICATIONS

HOJOKI GMBH, "CatchApp", Retrieved From <<https://getcatchapp.com/hojoki#monitor>>, Feb. 8, 2014, 4 Pages.
(Continued)

*Primary Examiner* — Amir Mehrmanesh
(74) *Attorney, Agent, or Firm* — Liang IP, PLLC

(57) ABSTRACT

User interface integration across multiple clouds is achieved by hosting UI extensions for different services in the same browser window. The UI extensions are initialized by a shell with any necessary security context for the corresponding cloud. The shell provides versioning so that the newest version of the UI is presented to users for all versions of a service. A connector in a local cloud provides translation between APIs across different clouds.

20 Claims, 11 Drawing Sheets

(51) Int. Cl.
  *G06F 9/50* (2006.01)
  *G06F 9/54* (2006.01)
  *G06F 3/0482* (2013.01)
(52) U.S. Cl.
  CPC .............. *H04L 67/10* (2013.01); *H04L 67/20* (2013.01); *H04L 67/36* (2013.01); *H04L 63/0815* (2013.01); *H04L 63/0884* (2013.01); *H04L 63/102* (2013.01); *H04L 67/02* (2013.01)

(56) References Cited

U.S. PATENT DOCUMENTS

| | | | |
|---|---|---|---|
| 9,003,297 | B2 | 4/2015 | Pierce |
| 9,239,812 | B1 | 1/2016 | Berlin |
| 9,270,730 | B2 | 2/2016 | McWhirter et al. |
| 9,282,097 | B2 | 3/2016 | Agarwal et al. |
| 9,384,209 | B2 | 7/2016 | Kim et al. |
| 2011/0138453 | A1 | 6/2011 | Verma et al. |
| 2011/0153727 | A1 | 6/2011 | Li |
| 2011/0276951 | A1 | 11/2011 | Jain |
| 2012/0159517 | A1 | 6/2012 | Shen et al. |
| 2012/0204169 | A1 | 8/2012 | Breiter et al. |
| 2012/0233589 | A1 | 9/2012 | Mruthyunjaya et al. |
| 2012/0324069 | A1 | 12/2012 | Nori et al. |
| 2013/0066940 | A1* | 3/2013 | Shao .................. H04L 67/1025 709/201 |
| 2013/0282748 | A1 | 10/2013 | Liensberger et al. |
| 2013/0283364 | A1* | 10/2013 | Chang .................... H04L 49/70 726/12 |
| 2013/0291121 | A1 | 10/2013 | Iovanov et al. |
| 2014/0059226 | A1 | 2/2014 | Messerli et al. |
| 2014/0101676 | A1 | 4/2014 | Lovegrove et al. |
| 2014/0108665 | A1 | 4/2014 | Arora et al. |
| 2014/0198909 | A1* | 7/2014 | Allen .................. H04L 12/1403 379/265.09 |
| 2014/0278623 | A1* | 9/2014 | Martinez ................ G06Q 10/06 705/7.12 |
| 2014/0280848 | A1 | 9/2014 | Modh et al. |
| 2015/0163288 | A1 | 6/2015 | Maes et al. |
| 2015/0373012 | A1 | 12/2015 | Bartz et al. |

FOREIGN PATENT DOCUMENTS

| | | |
|---|---|---|
| WO | 2013071087 A1 | 5/2013 |
| WO | 2014007811 A1 | 1/2014 |

OTHER PUBLICATIONS

"Cisco InterCloud", Retrieved From <<http://www.cisco.com/c/en/us/products/switches/intercloud/index.html>>, Mar. 31, 2014, 2 Pages.

"Okta—Simple and Complete: For IT and End Users", Retrieved From <<www.okta.com/what-we-do/single-sign-on.html>>, Jan. 19, 2012, 5 Pages.

"Your Dashboard for the Cloud", Retrieved From <<http://otixo.com/product>>, Jun. 16, 2011, 2 Pages.

"Non-Final Office Action Issued in U.S Appl. No. 14/309,846", dated Apr. 22, 2016, 9 Pages.

"International Search Report and Written Opinion Issued in PCT Application No. PCT/US2015/036111", dated Jan. 20, 2016, 19 Pages.

"Second Written Opinion Issued in PCT Application No. PCT/US2015/036111", dated Jul. 20, 2016, 5 Pages.

"Applications Integration", Retrieved from <<https://www.mulesoft.com/resources/esb/applications-integration>>, Mar. 10, 2013, 4 Pages.

"CloudRail API Integration Solution", Retrieved from <<https://cloudrail.com/cloudrail-api-integration-solution/>>, Aug. 25, 2016, 3 Pages.

"Connected Application", Retrieved from <<https://esf.eurotech.com/docs/connected-application>>, Aug. 25, 2016, 12 Pages.

"Dell Boomi AtomSphere", Retrieved from <<http://www.boomi.com/integration>>, Oct. 10, 2014, 3 Pages.

Trajanov, et al., "Semantic sky: a platform for cloud service integration based on semantic web technologies", Retrieved from <<http://dl.acm.org/citation.cfm?id=2362515>>, Sep. 5, 2012, 8 Pages.

"Office Action Issued in European Patent Application No. 15731808.0", dated Jan. 26, 2018, 5 Pages.

Belcher, Dan, "Introducing Google Stackdriver: Unified Monitoring and Logging for GCP and AWS", Retrieved from <<https://cloudplatform.googleblog.com/2016/03/Google-Stackdriver-integrated-monitoring-and-logging-for-hybrid-cloud.html>>, Mar. 23, 2016, 9 Pages.

"International Preliminary Report on Patentability Issued in PCT Application No. PCT/US2015/036111", dated Nov. 3, 2016, 11 Pages.

Shah, et al., "A Framework to Integrate Multiple Cloud Storage Services and Provide Consistent Feature Set", In Proceedings of Annual India Conference, Dec. 11, 2014, 5 Pages.

* cited by examiner

INTEGRATED USER INTERFACE FOR CONSUMING SERVICES ACROSS DIFFERENT DISTRIBUTED NETWORKS

CROSS-REFERENCE TO RELATED APPLICATION(S)

This application is a continuation-in-part and claims priority to U.S. patent application Ser. No. 14/309,846, filed on Jun. 19, 2014, the disclosure of which is incorporated herein in its entirety.

BACKGROUND

Cloud computing services in which users run applications on virtual machines hosted on a distributed network of servers are available from a number of different service providers. The cloud computing services can be hosted on a public cloud, such as a remote datacenter that host numerous tenant users. Cloud computing service can also be hosted on a private cloud, such as an enterprise datacenter that is available to a limited pool of users associated with the enterprise. Each cloud computing service provides its own proprietary user interface ("UI") and application programming interfaces ("API") that a user must be used to access services on a particular public or private cloud.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the disclosed technology provide abilities to connect resources from different clouds with an integrated UI and API experience. UI integration is achieved by hosting multiple UI extensions, each serving UIs for different cloud services, in the same browser window. Each UI extension is initialized with all necessary contextual information about the corresponding cloud service, such as a list of subscriptions from that cloud and the necessary security tokens for accessing data in the cloud. At the API level, a special connector service can proxy calls across multiple clouds and enable exposing services from multiple clouds via a single management service. Resources, usage, and subscriptions on one cloud service can be accessed directly by other cloud services via the connector service.

A single sign-in experience is possible by federating identity providers. Different clouds can be connected so that subscriptions from a remote cloud can be imported in a local cloud. Alternatively, resources on a remote cloud can be linked into an existing subscription on a local cloud. The UI and API integration allows users to see resources and services coming from different clouds as if they came from one "integrated" or hybrid cloud.

DETAILED DESCRIPTION

Figure 1:
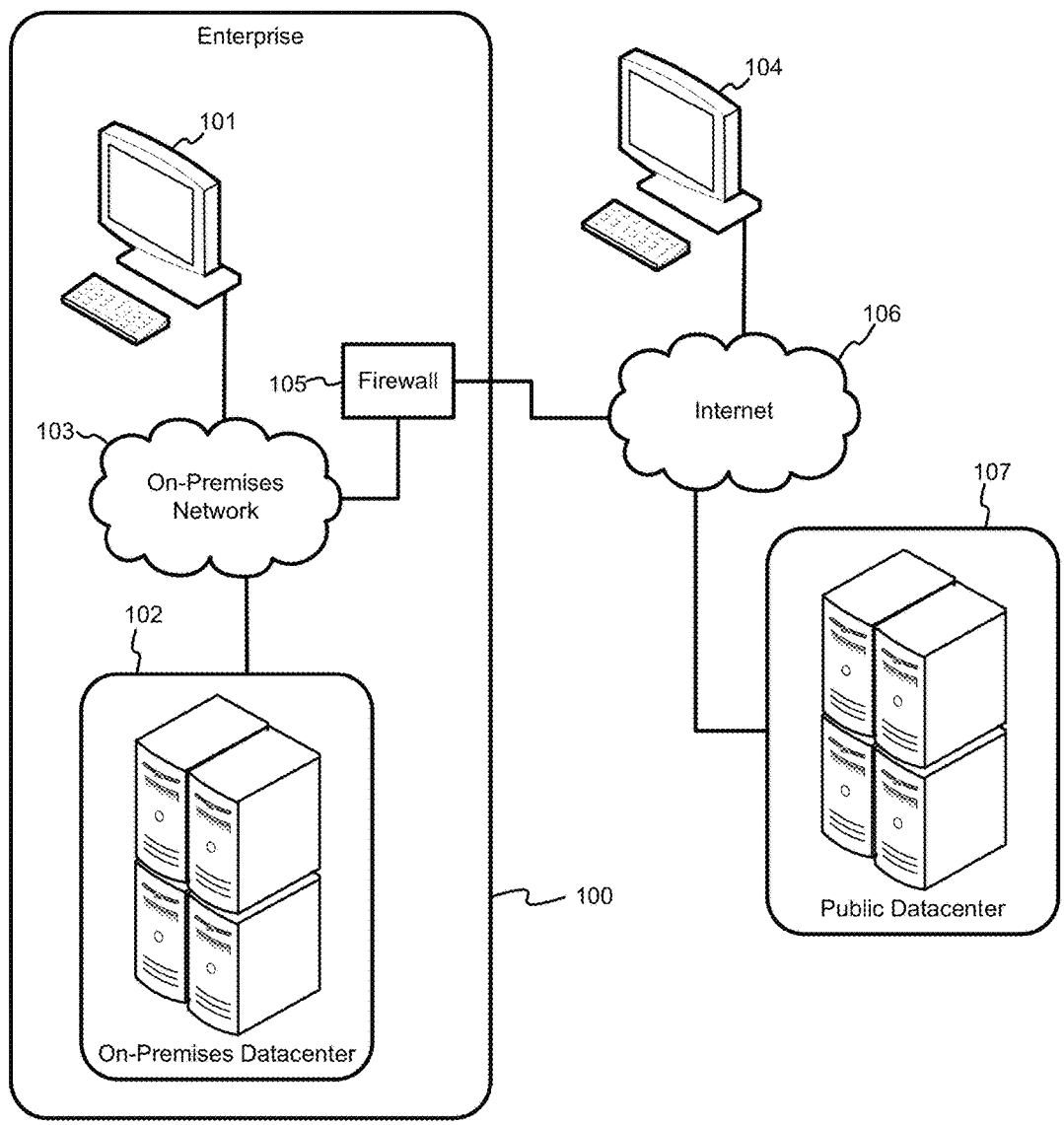
FIG. 1 is a schematic block diagram of a computing system that provides enterprise users with access to local on-premises resources and to remote or public resources in accordance with embodiments of the disclosed technology.

FIG. 1 is a block diagram of a computing system that provides enterprise users with access to local on-premises resources and to remote or public resources in accordance with embodiments of the disclosed technology. Local enterprise terminal 101 allows users to directly access on-premises datacenter 102 via on-premises network 103. Users located outside enterprise 100 can access on-premises datacenter 102 using remote terminal 104. Terminals 101 and 104 can be, for example, a desktop, laptop, notebook, or tablet computer. Other devices, such as dedicated terminals, smartphones, personal digital assistants ("PDA") can also be used as terminals 101 and 104.

Firewall 105 provides network security for enterprise 100 and controls incoming and outgoing network traffic. External terminal 104 can connect to enterprise on-premises network 103 via the Internet 106 or any public or private network. Firewall 105 allows terminal 104 to access on-premises datacenter 102 if terminal 104 provides the appropriate credentials and authentication. Enterprise users at terminals 101 and 104 can also access public datacenter 107 via the Internet 106.

On-premises datacenter 102 and public datacenter 107 can provide "cloud computing" services to enterprise 100 and other users. By freeing enterprise users from managing information technology (IT) infrastructure, cloud computing provides virtually limitless compute, storage, and network resources at low cost, while allowing services to scale on demand.

As used herein, the term "cloud computing system" or "cloud" generally refers to a computer system configured to provide various cloud computing services via a computer network. A cloud computing system can include multiple network devices interconnecting a large number of remote servers or nodes to one another and/or to external networks (e.g., the Internet). For example, a cloud computing system can include multiple containers, racks, or other suitable enclosures each holding multiple servers in a cloud computing datacenter (or portions thereof). The term "network device" generally refers to a network communications component. Example network devices include routers, switches, hubs, bridges, load balancers, security gateways, or firewalls. A "node" generally refers to a computing device configured to implement one or more virtual machines, virtual routers, virtual gateways, or other suitable virtualized computing components. For example, a node can include a computing server having a hypervisor configured to support one or more virtual machines.

As used herein, the term "public cloud" or "public cloud computing system" generally refers to a cloud computing system that provides subscription of cloud services to the general public. Examples of public cloud include Microsoft Azure®, Amazon Web Services®, and Google Compute®. In contrast, the term "private cloud" or "private cloud computing system" generally refers to a cloud computing system for internal use of and under strict access control of an organization due to security, data protection, privacy, or other concerns. A public cloud or users outside of an organization typically do not have access to a private cloud of the organization. The term "hybrid cloud" generally refers to a cloud computing system having a portion being a public cloud interconnected to another portion that is a private cloud. As discussed in more detail below, several embodiments of the disclosed technology can integrated UI and API between a public cloud and a private cloud.

Also used herein, the term "cloud computing service," "cloud service," or "service" generally refers to one or more computing resources provided over a computer network such as the Internet. Example cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

Also used herein, the term "resource provider" generally refers to a cloud service that is configured to provide or make available one or more resources of a public or private cloud. The one or more resources can be deployed and managed through, for example, a "resource manager" accessible via a user portal. In certain embodiments, a resource provider can be configured to offer representational state transfer ("REST") Application Programming Interfaces ("APIs") for working with associated resources. For example, a resource provider can be configured to deploy a key vault for storing keys and credentials. This resource provider can provide an example resource type called "vault" for creating a key vault, and another example resource type called "vault/secret" for creating a secret in the key vault. In other embodiments, resource providers can also provide computing resources (e.g., virtual machines), storage resources (e.g., network storage), network resources (e.g., virtual networks), database resources (e.g., database servers), or other suitable types of resources.

Figure 2:
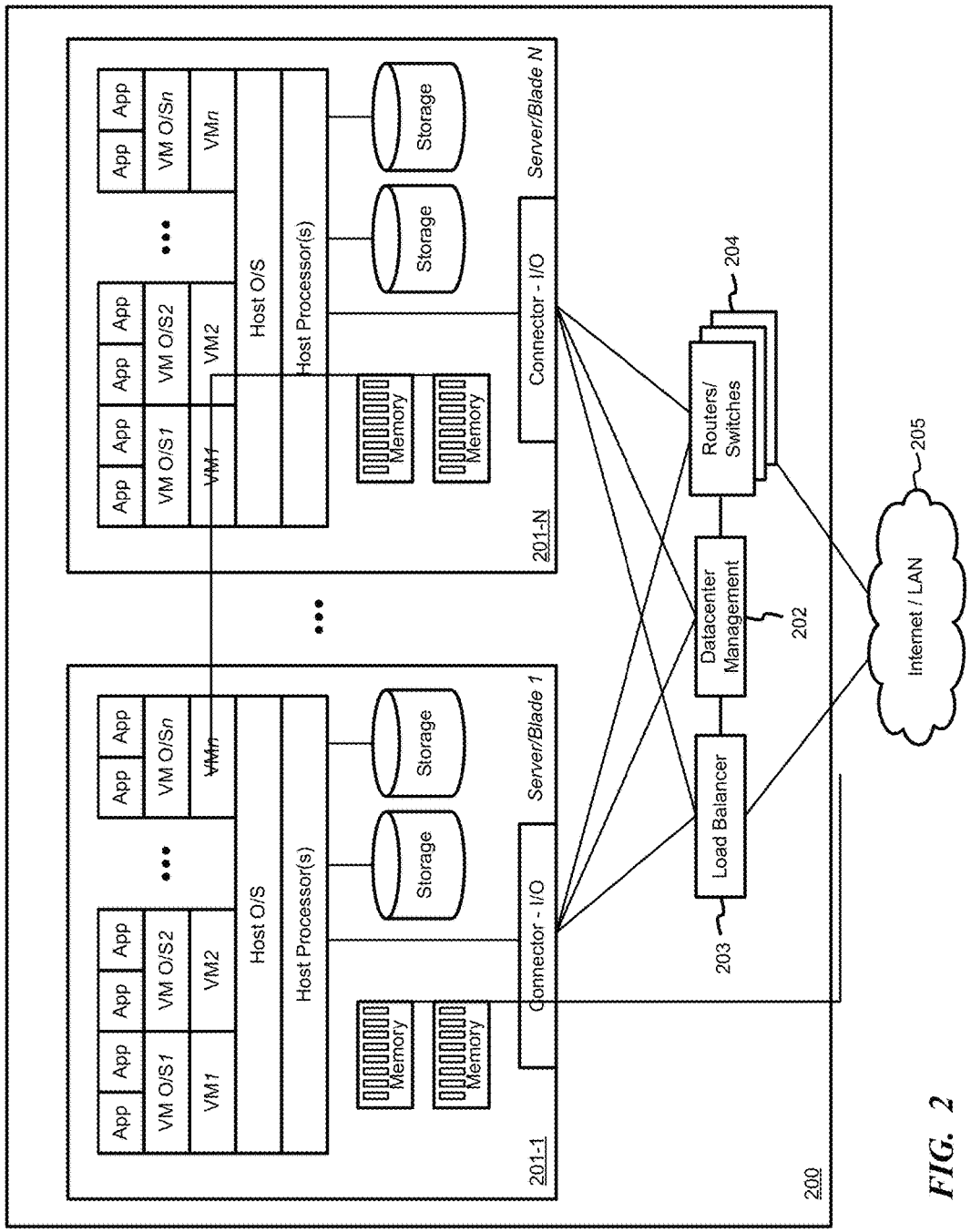
FIG. 2 is a schematic block diagram of a datacenter that provides cloud computing services or distributed computing services in accordance with embodiments of the disclosed technology.

FIG. 2 is a block diagram of a datacenter 200 that provides cloud computing services or distributed computing services according to one embodiment. A plurality of servers 201 are managed by datacenter management controller 202. Load balancer 203 distributes requests and workloads over servers 201 to avoid a situation where a single server 201 becomes overwhelmed and to maximize available capacity and performance of the resources in datacenter 200. Routers/switches 204 support data traffic between servers 201 and between datacenter 200 and external resources and users via external network 205, which can be a local area network ("LAN") in the case of an enterprise, on-premises datacenter 102 or the Internet in the case of a public datacenter (107).

Servers 201 can be standalone computing devices and/or can be configured as individual blades in a rack or other suitable containers. Servers 201 have an input/output (I/O) connector that manages communication with other database entities. One or more host processors on each server 201 run a host operating system ("O/S") that supports multiple virtual machines ("VMs"). Each VM can run its own O/S so that each VM O/S on a server is different, or the same, or a mix of both. The VM O/S's can be, for example, different versions of the same O/S (e.g., different VMs running different current and legacy versions of the Windows® operating system). In addition, or alternatively, the VM O/S's can be provided by different manufacturers (e.g., some VMs running the Windows® operating system, while others VMs run the Linux® operating system). Each VM can then run one or more applications (App). Each server also includes storage (e.g., hard disk drives ("HDD") and memory (e.g., RAM) that can be accessed and used by the host processors and VMs.

Cloud computing can deliver computing capabilities as services, access to IT resources like compute power, networking and storage. As with any utility, users generally only pay for what is used with cloud computing. By tapping into cloud services, users can harness the power of massive data centers without having to build, manage or maintain costly, complex IT building blocks. With the cloud, much of the complexity of IT is transparent to users, letting users instead focus just on infrastructure, data and application development.

Datacenter 200 provides pooled resources on which customers or tenants can dynamically provision and scale applications as needed without having to add more servers or additional networking. This allows tenants to obtain the computing resources as needed without having to procure, provision, and manage infrastructure on a per-application, ad-hoc basis. A cloud computing datacenter 200 allows tenants to scale up or scale down resources dynamically to meet the current needs of their business. Additionally, a datacenter operator can provide usage-based services to tenants so that they pay for only the resources they use, when they need to use them. For example, a tenant can initially use one VM on server 201-1 to run their applications. When demand increases, the datacenter can activate additional VMs on the same server and/or on a new server 201-N as needed. These additional VMs can be deactivated if demand later drops.

Datacenter 200 can offer guaranteed availability, disaster recovery, and back-up services. For example, the datacenter 200 can designate one VM on server 201-1 as the primary location for the tenant's application and can activate a second VM on the same or different server as a standby or back-up in case the first VM or server 201-1 fails. Database manager 202 automatically shifts incoming user requests from the primary VM to the back-up VM without requiring tenant intervention. Although datacenter 200 is illustrated as a single location, in other embodiments, servers 201 can be distributed to multiple locations across the globe to provide additional redundancy and disaster recovery capabilities.

The datacenter operator can offer different levels of cloud computing services to tenants. With an Infrastructure-as-a-Service (IaaS) offering, the lower levels of the IT stack are delivered as a service, which frees up developers from much of the complexity of provisioning physical machines and configuring networks. With IaaS, tenants can easily provision virtual machines in a highly scalable and available cloud environment, develop and test solutions, then deploy applications to production. With a Platform-as-a-Service (PaaS) offering, everything from network connectivity through the runtime is provided. PaaS makes development easy by providing additional support for application services and management of the operating system, including updates. With PaaS, tenants can focus on the business logic of application and quickly move applications from concept to launch. With a Software-as-a-Service (SaaS) offering, a single finished application or suite of applications can be delivered to customers through a web browser, thereby eliminating their need to manage the underlying components of the IT stack including application code.

Referring again to FIG. 1, an enterprise can use a public datacenter or public cloud to take advantage of cost savings, reduced management requirements, or particular services offered. On the other hand, the enterprise can also use an on-premises datacenter or private cloud to ensure data security or to use a proprietary application. It can be understood that an enterprise does not have to use an on-premises datacenter to take advantage of private cloud services. Instead, private cloud services can be provided by a datacenter that limits access to the enterprise.

Different cloud computing services can require different APIs and different UIs. In a hybrid cloud situation, where some services are provided by private cloud computing, which runs on an on-premises datacenter for example, and other services are provided by a public cloud, enterprises manage different APIs and UIs to ensure use of correct APIs and UIs for each cloud. Current cloud providers enable consumption of corresponding cloud services, but does not allow consumption of services from other clouds to provide a single UI user experience and API. Instead, current services are only offered in respective host cloud. As a result, user experience can be improved if services provided from multiple clouds can be accessed via integrated UIs and/or APIs to access resources across multiple clouds.

Embodiments of the disclosed technology can integrate cloud computing services from multiple clouds and allow one cloud computing service to configure itself to consume resources from another cloud computing service. For example, a database service hosted in a private cloud can be configured to backup into a public cloud while the enterprise user only has to access one interface, instead of requiring users to open two UI applications and make different API calls to different clouds, using two different security mechanisms.

Figure 3:
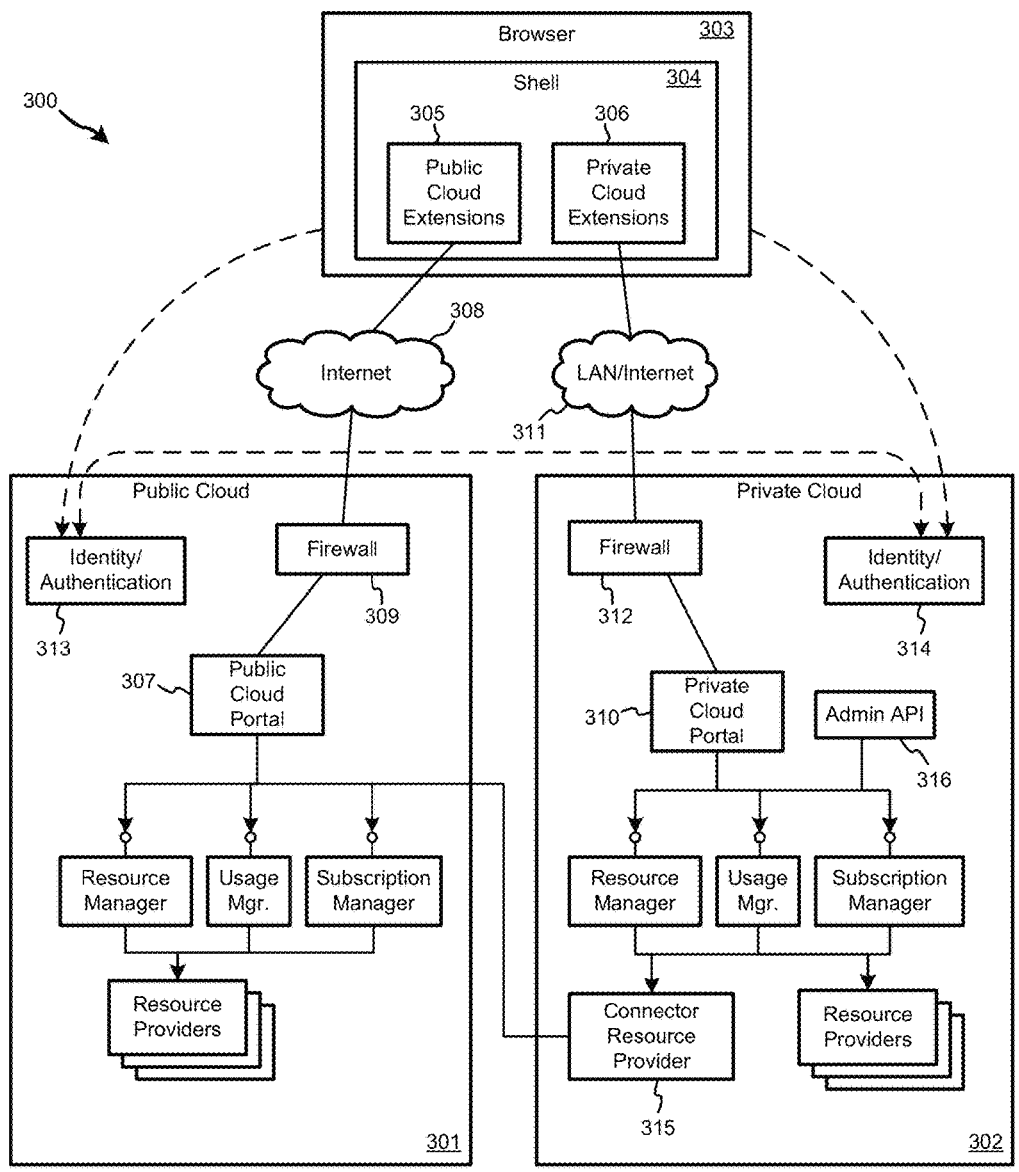
FIG. 3 is a schematic block diagram illustrating a system for providing integrated user interface and API for multiple cloud services in accordance with embodiments of the disclosed technology.

FIG. 3 is a block diagram illustrating one embodiment of a system 300 for providing one user interface and a consistent API for multiple cloud services, such as a public or remote cloud 301 and a private or local cloud 302. Both clouds can provide similar services, such as database services, but the service on each cloud can have a different identity. The database services can have similar UIs, but the services that plug into the UIs can be different for each cloud. Embodiments of the present disclosed technology can connect the different clouds in such a way that the user accesses a UI, such as via a browser 303, and consumes services from both clouds as if they were hosted on one cloud. The integrated UI hides the cloud boundaries from the user so that they can access and manage different cloud services under one UI. The user can select a desired interface for a selected service, such as using the database service UI for private cloud 301 to access database services from each cloud. Although the user is accessing different services on different clouds, the UI provides a seamless integration.

The integration of multiple clouds has two parts—an integrated UI and an integrated API. The example system in FIG. 3 illustrates providing an integrated UI on a browser 303. However, it can be understood that an integrated UI can be provided via other applications, such as an integrated development environment (IDE) or other tool, that access services or data on both clouds.

Browser 303 loads and initializes a shell 304, which loads a list of the user's cloud service subscriptions. The shell 304 can be JavaScript® that is loaded from a website, for example. Based upon the subscriptions, the shell 304 can determine what assets and services the user is registered to use and where those are located in public cloud 301 or private cloud 302. For example, the user can be registered to manage VMs, websites, and/or SQL database services. Some of these services can be served from the public cloud 301 and other served locally from private cloud 302.

Shell 304 creates frames 305, 306 in the browser and points the frames to different websites that serves extensions for the different services to which the user is subscribed. Frames (e.g., HTML iFrames) can be used in the browser to provide isolation of data processing between cloud services. Public cloud extension 305 serves a UI from a website for the public cloud 301, and private cloud extension 306 services a UI from a website for the private cloud 302. Each frame 305, 306 receives its respective information and shell 304 coordinates the frames into a unified UI that is an assembly of the different extensions. Each extension with associated UI can be loaded from a different cloud and is adapted to enable a specific security context, such as identification and authentication, for that cloud.

In certain embodiments, shell 304 can function as a basic operating system that expects a certain implementation or format for the cloud extensions associated with individual services. As long as a compliant extension can be created, the shell 304 can create a frame for any cloud. For example, different extensions can be created to access cloud services running on Microsoft Azure, Windows Azure Pack (WAP), Amazon Web Services (AWS), Google Cloud Platform, etc. Shell 304 provides for the converging of UIs for multiple different homogenous and/or heterogeneous cloud services. The UI allows abstracting the cloud boundaries from the user to such that users can be offered a mixed plan where services or service regions are offered across cloud boundaries without user even noticing the cloud boundary.

Shell 304 provides a cloud-management user experience that can natively and seamlessly expand across cloud boundaries. Public cloud 301 and private cloud 302 can offer both the same and different services. Shell 304 loads native UI extensions for managing individual services across cloud boundaries. The appropriate version for managing each cloud service is loaded by the extension. For example, a newer version of a VM management service can be loaded for public cloud 301 compared to the version of VM management service loaded for private cloud 302.

Although FIG. 3 illustrates a computing system using a public and private cloud, it can be understood that the present disclosed technology can be used with any combinations of cloud services. For example, browser 303 can provide a UI to two private clouds or to two public clouds. Shell 304 loads the appropriate extensions for the user's registered clouds services. In other embodiments, more than two cloud services can be accessed using browser 303. The update rates for each cloud can vary so that some clouds can have a more recent version of a service than other clouds. Shell 304 can be updated quickly using the extensions so that when a UI changes in one cloud, the newest version of the UI can be served to users by shell 304.

Service agnostic portions of shell 304 can load some parts from different clouds. Shell 304 identifies which cloud has the latest version of the UI and loads that newest version. Along with the latest version, the shell loads a "sandbox"

that can load older versions of the UI. The sandbox makes the older version appear to the shell as if it is the newest version. This can be accomplished by performing appropriate API translations for the changes to the UI. While the older version of the API is used with a cloud having the old version, the shell loads the newer version of the service UIs for the user. As a result, users can be presented with an updated UI version even when navigating to older versions of the service on other clouds.

The theme presented on browser 303 can be standardized across different clouds. For example, when a newer version of a UI is loaded from public cloud 301, browser 304 can still use a local theme associated with private cloud 304, even if that theme was created for an older version of the service. This allows styling and customizations for one cloud to be presented to the user for all clouds. In other embodiments, when the same services are offered both the public cloud 301 and private cloud 302, browser 303 can use a single UI extension to manage resources across both clouds. This single UI extension can be used even when the deployed services are different versions. Browser 303 manages user identity so that using a log-on for private cloud 302 allows the user to also access resources on public cloud 302 and across all cloud boundaries. Example operations related to accessing multiple cloud computing systems via an integrated UI are described below with reference to FIGS. 5A-5D.

Each cloud has a portal that is accessed by the extension loaded on browser 304. Public cloud portal 307 provides an API framework appropriate for interfacing public cloud extension 305 to public cloud 301 across Internet 308. Firewall 309 provides security for public cloud 301. Extension 305 is configured to traverse firewall 309 as needed to access public cloud 301. Private cloud portal 310 provides an API framework appropriate for interfacing private cloud extension 306 to private cloud 302 across network 311. If browser 303 and private cloud 302 are in the same location, then network 311 can be a LAN or enterprise network. If browser 303 is remote from private cloud 302, then network 311 can be the Internet. Firewall 312 provides security for private cloud 302, such as when browser 303 accesses services over the Internet or other public network.

Portals 307 and 310 provide access to the resource manager, usage manager, and subscription manager on each cloud. The resource manager coordinates the resource providers, which can provide instances of VM, website, and database resources, for example. The usage manager monitors resource consumption for billing. The subscription manager maintains tenant subscriptions, including connectors, connected services, and quotas.

Clouds 301 and 302 can use role-based access control (RBAC) to control what administrators and tenants can do and to restrict access to authorized users based on the roles of individual users within an enterprise. Browser 303 connects to identity/authentication manager 313 or 314 as appropriate to verify users and to determine what access they should be provided on each cloud. The identity/authentication managers 313, 314 can also communicate with each other. This allows users to access one portal then look at both clouds. Identity/authentication manager 313 can use Azure Active Directory in one embodiment as a comprehensive identity and access management solution for public cloud 301. Identity/authentication manager 314 in private cloud 302 can be a Security Token Service (STS), for example, that acts as a security gateway to authenticate users and to issue security tokens carrying claims that describe the user.

Like the integrated UI, the integrated API provides a common interface for the clouds. This is accomplished, for example, using a connector resource provider 315 in private cloud, which is responsible for connecting to remote, public cloud 301. Connector resource provider 315 translates the native API for cloud 301 so that it is compatible with the resource provider contract in the other cloud. The connector resource provider 315 has the identical interface as the other resource providers on private cloud 302, but also includes a link to the remote cloud 301.

Connector resource provider 315 translates the resource manager API on private cloud 302 to the resource manager API used on public cloud 302. Connector resource provider 315 also translates the usage API on private cloud 302 to the usage API on public cloud 302. This allows, for example, resource consumption on the remote cloud to be used at the private cloud for aggregated billing. Connector resource provider 315 also translates the subscription management API on private cloud 302 to the subscription management API on public cloud 302. This allows the private cloud 302 to configure a quota that is enforced in public cloud 301 via the connector resource provider 315.

With the connector 315, when a user in private cloud 302 encounters the local API endpoint, the user can see a list of resources available from both private cloud 302 and public cloud 301 as if the resources were registered locally even though physically the resources are located on a remote cloud. For example, the user can have a database service on the private cloud, but the public cloud can provide additional database services. Using the connector 315, the user can have access to those additional database services on the private cloud as if they were present locally.

Using this special connector service at the API level, connector 315 proxies calls across clouds and enables exposing all services from all clouds via a single management service. Connector 315 federates identity across clouds 301 and 302 to provide a single sign-on procedure for users. Each cloud can use a different identify provider 313, 314 to connect to the API. Connector 315 allows the user to log-in to the private cloud 302 and to consume services from public cloud 301 without having to log-in again on public cloud 302. This can be accomplished in one embodiment by synchronizing identity and authentication directories 313 and 314.

In one embodiment, there are managed and unmanaged options for offering cross-cloud connectivity. Each option establishes a relationship between different clouds so that the user can access resources on both clouds. The user has a subscription to both clouds or needs services from both clouds and needs to manage that connection. For unmanaged access, an end user is provided with un-scoped, ungoverned access to a subscription in a remote cloud from a local cloud's portal. The billing relationship with the remote cloud provider is owned by the end user. The remote subscription's services, quotas, and resources are not tied to the local subscription. The end user is privy to a subscription from the local cloud provider and a separate subscription from the remote cloud provider. The end user registers the remote subscription with the local cloud provider so that services in the remote cloud can be accessed. For managed access, the end user is provided with scoped, governed access to a subscription in a remote cloud from the local cloud's portal. The billing relationship with the remote cloud is handled by the local cloud provider, and the billing relationship with the provider is handled by the end user. The remote subscription's services, quotas, and resources are mounted or appended with the local subscription's services, quotas, or resources. The end user is privy only to one subscription, which is from the local cloud provider.

An admin API 316 is used to register a remote, public cloud 301 with local, private cloud 302. The admin API 316 is used to make private cloud 302 aware of public cloud 301 so that private cloud 302 can bring in external resources from public cloud 301. Admin API 316 allows the user to link existing subscriptions on private cloud 302 to services that are available on public cloud 301. Alternatively, private cloud portal 310 is a tenant API that can be used to import existing subscriptions from public cloud 301 to provide access to services available on private cloud 302. The imported subscriptions are registered with private cloud 302 so that the user can access services from both clouds. This allows users to bring their own existing public cloud subscriptions to a private cloud account. The subscriptions are registered locally to allow the user to access the remote services. Usage managers on public cloud 301 can then associate resource use from the private cloud 302 with a particular subscription for billing.

For simplification, the examples described above use only two cloud services —a local or private cloud and a remote or public cloud. However, it can be understood that there is no limit on how many different clouds can be connected this way. The connector or multiple instances of the connector resource provider can be used to link one cloud service to one or more additional cloud services.

Figure 4:
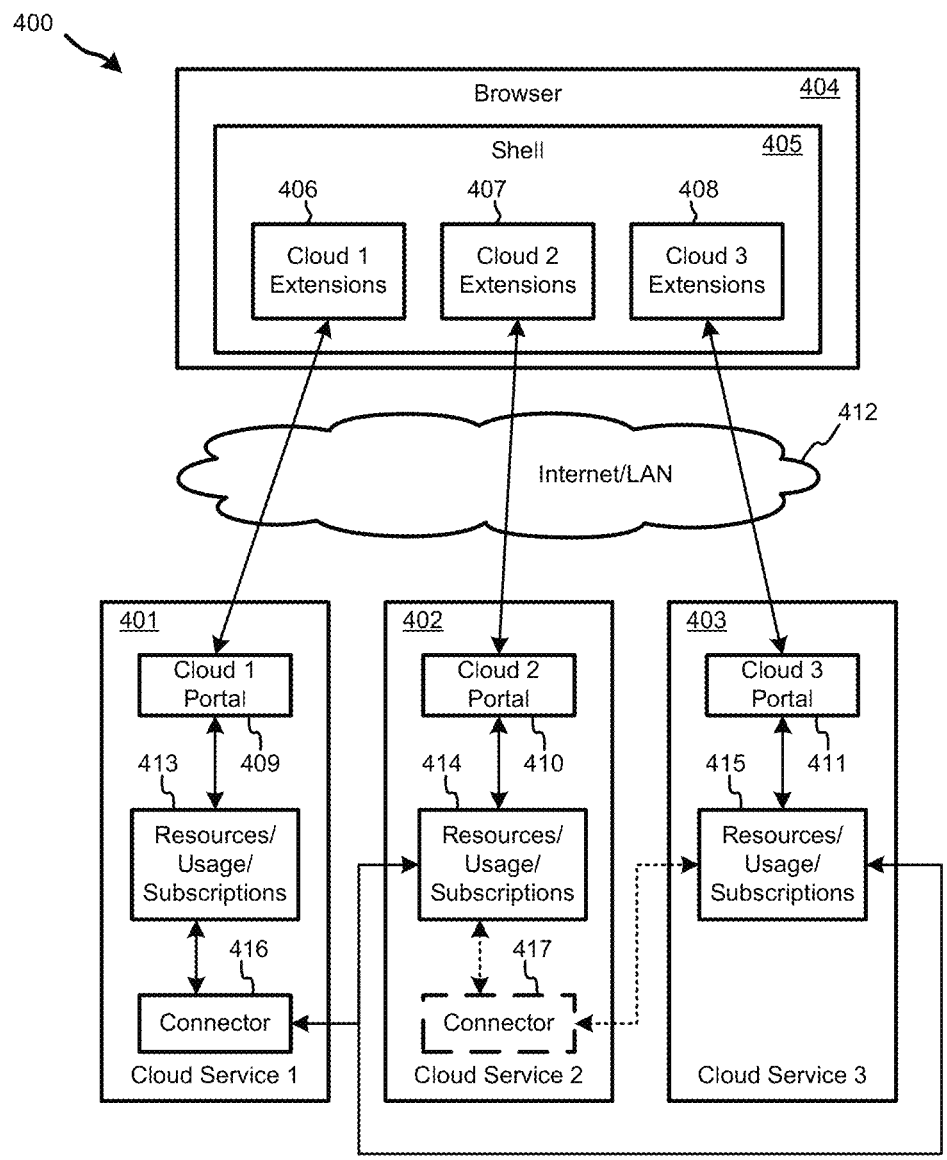
FIG. 4 is a schematic block diagram illustrating a computing system using integrated UI API to link multiple cloud services in accordance with embodiments of the disclosed technology.

FIG. 4 illustrates a system 400 using an integrated UI and an integrated API to link three cloud services. In this example, a user has subscriptions to services on from cloud services 401, 402, 403. These cloud services 401-403 can be any combination of private and/or public clouds. Cloud services 401-403 can be supported by different service providers, such as an enterprise IT department that maintains a private cloud service for a restricted user group or a remote service provider that maintains a public cloud service that is available to many tenants. Cloud services 401-403 can be located in datacenters that are remote from each other and that are maintained by the same or different providers. Alternatively, cloud services 401-403 can be co-located, but isolated sub-sections of the same datacenter.

Users access the cloud services using a browser 404. In different embodiments, browser 404 can be running on a machine that is remote from all of the cloud services 401-403 or that is co-located with one or more of the services, such as an enterprise machine co-located with a private cloud. Browser 404 loads shell 405, which loads a list of the user's cloud service subscriptions. Based upon the subscriptions, the shell can determine what assets and services the user is registered for and where those are located in cloud services 401-403. Shell 405 then loads native UI extensions 406, 407, 408 corresponding to cloud services 401-403, respectively. Shell 405 and cloud extensions 406-408 can be loaded, for example, from a locally hosted web page or from a remote web page hosted by one of the cloud services 401-403. Each of the cloud extensions 406-408 are adapted to connect to a cloud portal 409, 410, 411 for the corresponding cloud service 401-403.

Shell 405 creates frames in browser 404 and points the frames to cloud extensions for the cloud services to which the user is subscribed. Each frame receives its respective information and shell 405 coordinates the frames into a unified UI for the user. The extension 406-408 for each cloud is adapted to enable a specific security context for that cloud. Cloud portals 409-411 provide an API framework appropriate for interfacing their respective cloud extension and cloud service across network 412, which can be an enterprise LAN or public Internet depending upon the location of the machine running browser 404 and each cloud service 401-403. Portals 409-410 provide access to resources, usage, and subscriptions 413, 414, 415 on each cloud service.

Connector 416 provides an integrated API that translates the native API for each cloud service so that it is compatible with the resource provider contract in other cloud services. Connector 416 translates the resource manager API on cloud service 401 to the resource manager, usage, and subscription management APIs used on cloud services 402 and 403. This allows the user to see a list of subscribed resources that are available across all of the cloud services 401-403. Those resources appear to the user as if they were registered locally on cloud service 401 even though the resources are physically located on a remote cloud 402, 403. Connector 416 or multiple instances of connector 416 can be used to link one cloud service to multiple other cloud services. In other embodiments, a connector 417 on a remote cloud service 402 can be used to link services and resources between remote cloud services 402 and 403. This would allow the resources to which the user is subscribed on cloud service 402 to directly access related resources on cloud service 403 without requiring action from cloud service 401, which would be a third-party to that transaction.

Figure 5A:
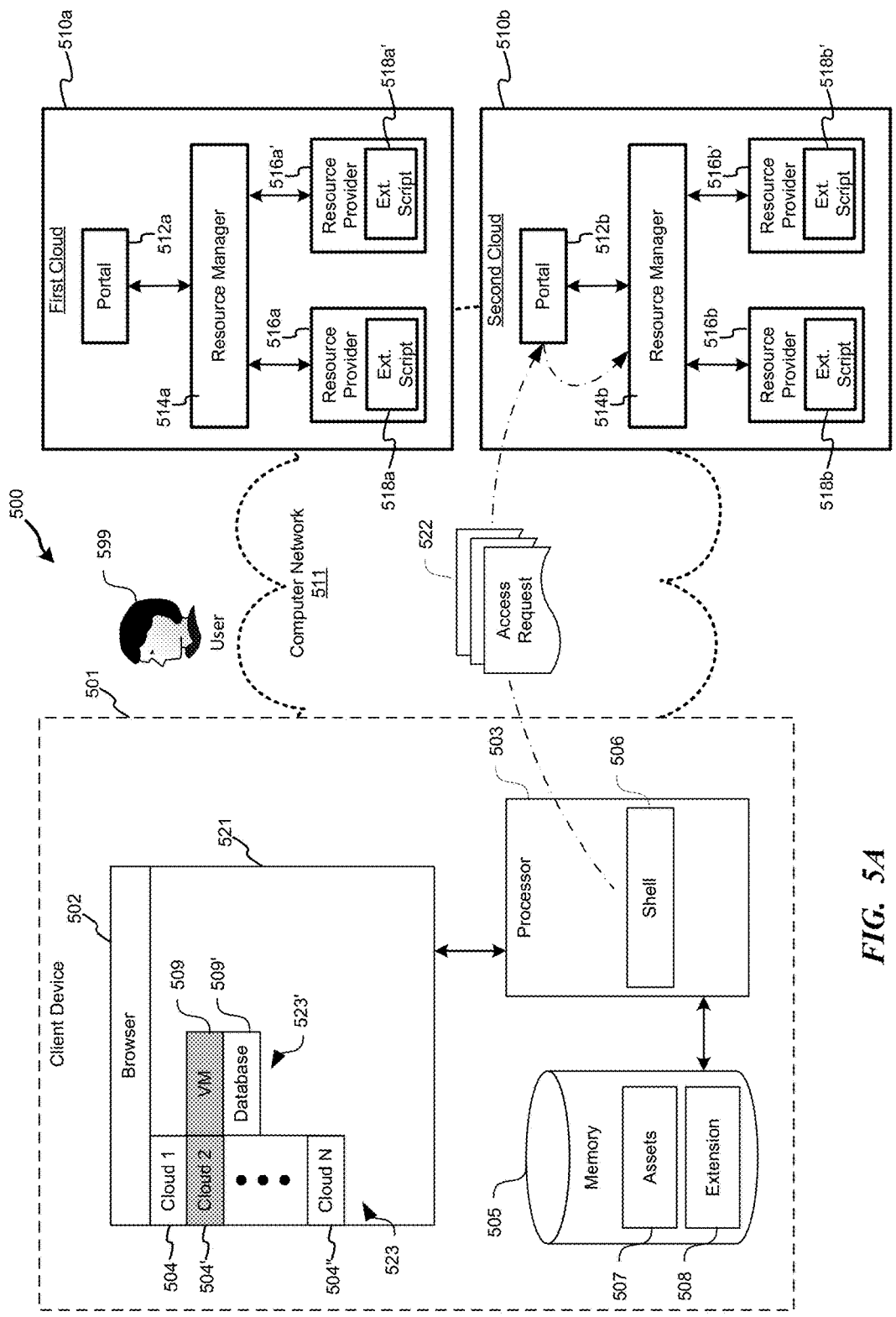
FIGS. 5A-5F are schematic diagrams illustrating certain operations related to accessing multiple cloud computing systems via an integrated user interface in accordance with embodiments of the disclosed technology.

FIGS. 5A-5F are schematic diagrams illustrating certain operations in a computing system 500 related to allowing a user 599 accessing multiple cloud computing systems via an integrated user interface in accordance with embodiments of the disclosed technology. As shown in FIG. 5A, the computing system 500 can include a client device 501 coupled to a first cloud 510a and a second cloud 510b via a computer network 511. The computer network 511 can include an enterprise intranet, a wide area network, a local area network, the Internet, or other suitable types of network. Even though particular components are shown in FIGS. 5A-5F for illustrating aspects of the disclosed technology, in other embodiments, the computing system 500 can also include additional and/or different components. For example, the computing system 500 can also include other client devices, cloud computing systems, computer networks in addition to or in lieu of the components shown in FIGS. 5A-5F.

As shown in FIG. 5A, the first and second clouds 510a and 510b can each include a portal 512a or 512b, a resource manager 514a or 514b, and one or more resource providers 516a, 516a', 516b, or 516b' (collectively referred to as resource providers 516). In certain embodiments, one of the first or second cloud 510a and 510b can be a private cloud while the other is a public cloud. In other embodiments, both the first and second clouds 510a and 510b can be private clouds or public clouds. Even though particular components of the first and second clouds 510a and 510b are shown in FIG. 5A, in other embodiments, the first and second clouds 510a and 510b can also include storage services, computing services, web services, database services, or other suitable types of resource providers.

The portal 512a or 512b can be configured to provide a gateway to access various services at the first and second clouds 510a and 510b. One example portal 512a or 512b can include a website configured to provide various management and/or access capabilities upon authentication. The resource manager 514a or 514b can be configured to deploy, monitor, and/or manage resources in the first and second clouds 510a and 510b that is available to a subscriber or user 599. The resource manager 514a or 514b can allow a subscriber to interact with available resources as a group. For example, the resource manager 514a or 514b can allow deployment, update, or deletion of one or more available resources in a coordinated operation. The resource manager 514a or 514b can also be configured to provide security, auditing, and tagging features to facilitate management of resources after deployment. Even though the first and second clouds 510a and 510b are shown in FIG. 5A as having the resource manager 514a or 514b, in other embodiments, the resource manager 514a or 514b may be omitted. In such embodiments, a subscriber can manage various available resources in the first and second clouds 510a and 510b individually, separately, or in other suitable manners.

The resource providers 516 can be configured to provide various resources such as virtual machines, database services, or other suitable services. Each of the foregoing services can be a cloud service provided by one or more remote servers (not shown) of the first and second clouds 510a and 510b via execution of suitable instructions. As shown in FIG. 5A, each of the resource providers 518 can be associated with an extension script 518 (illustrated as extension scripts 518a, 518b, 518c, and 518d, respectively). In certain embodiments, each of the extension script 518 can include JavaScript instructions specifying a view model as well as one or more content scripts related to a corresponding resource provider 516. In other embodiments, the extension script 518 can also include other suitable instructions in a suitable scripting language.

The view model can include instructions specifying a framework that defines a set of views to be used for visualizing a service (e.g., VM) provided by the corresponding resource provider 516. For example, the view model can specify that information related to the service is to be outputted in a separate blade having text, graphs, videos, or other suitable types of media. In other examples, the view model can also specify other suitable information related to outputting data related to the service. The content script can include instructions related to identification of and retrieval of information from one or more network addresses at which data related to the service is retrievable via, for example, asynchronous JavaScript and XML ("AJAX") calls. In the illustrated embodiment below with reference to FIGS. 5C and 5D, the content source includes one of the resource providers 516. In other embodiments, the content source can include a website, a network storage, or other suitable sources.

The client device 501 can be configured to facilitate access to cloud services provided by the first and second clouds 510a and 510b via the computer network 511. The client device 501 can be a desktop computer, a laptop computer, a tablet computer, a smartphone, or other suitable types of computing device. As shown in FIG. 5A, the client device 501 can include a processor 503 operatively coupled to a memory 505. The processor 503 can include a microprocessor, a field-programmable gate array, and/or other suitable logic devices. The memory 505 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 503 (e.g., instructions for performing the methods discussed below with reference to FIGS. 6A-6B). In other embodiments, the client device 501 can also include input/output components (e.g., a display, a touch screen, a keyboard, a mouse, a printer, etc.), networking components (e.g., a network interface card), and/or other suitable hardware components.

As shown in FIG. 5A, the processor 503 can execute instructions from the memory 505 to provide a user interface for facilitating access to both first and second clouds 510a and 510b. In the illustrated embodiment, the user interface is shown as a browser 502 showing a webpage 521 related to a portal for accessing the first and second clouds 510a and 510b. In other embodiments, the user interface 502 can also include other suitable types of man-machine interface. To provide the user interface shown in FIG. 5A, the processor 503 can execute a web browser application (e.g., Internet Explorer provided by Microsoft Corporation of Redmond, Wash.) to initiate the browser 502 and load the webpage 521. As shown in FIG. 5A, the webpage 521 can include a list of clouds 504 (showing as cloud 1, cloud 2, . . . , cloud N) to which the user 599 has subscription(s) shown in a panel, frame, or "blade" 523 on the webpage 521. In other embodiments, the list of clouds 504 can also be outputted using dropdown menus, selection buttons, or other suitable interface objections. While loading the webpage 521, the processor 503 can also execute a script (e.g., a JavaScript) related to the webpage 521 to provide a shell 506 configured to facilitate access to the first and second clouds 510a and 510b, as described in more detail below.

In the illustrated example in FIG. 5A, the user 599 provides an input that selects "cloud 2." In response to the received input from the user 599, the processor 503 can determine a list of services or resources available to the user 599 at the second cloud 510b based on a registered subscription and/or identity of the user 599 in the second cloud 510b. For example, the processor 503 can retrieve one or more records of asset 507 related to the second cloud 510b from the memory 505 and determine which services or resources are available to the user 599 based thereon. In certain embodiments, the individual record of asset 507 can identify a service type (e.g., VM) as well as an interface object (e.g., a blade 523') in which the service is to be displayed. In other embodiments, the records of asset 507 can also specify other suitable information related to the services 509. In the illustrated example, the processor 503 determines and outputs on the webpage 521 two services from the second cloud 510b, i.e., "VM" 509 and "Database" 509' in a new blade 523'.

The processor 503 can then detect another user input indicating that the user 599 selects "VM" 509 to access a virtual machine service from the second cloud 510b. In response to the received user input selecting "VM" 509, the processor 503 can retrieve an extension record 508 related to the selected service, i.e., "VM" 509 from the memory 505. The extension 508 can include various fields identifying, for example, a name (e.g., "virtual machine"), an associated cloud providing the service (e.g., "Cloud 2"), and a network address (e.g., a universal resource locator or "URL") at which the service can be accessed. In other examples, the extension record 508 can also include a subscription level, a usage limit, and/or other suitable information related to the selected service.

Based on the information from the retrieved extension record 508, the shell 506 executing on the processor 503 can generate and transmit an access request 522 to the second cloud 510b based on, for example, the URL in the extension record 508. As shown in FIG. 5A, the second cloud 510b can receive the access request 522 at the portal 512b. the portal 512b can then pass the access request 522 to a corresponding resource provider 516b' via the resource manager 514b upon authentication. The resource provider 516b' is configured to provide the selected VM 509 at the second cloud 510b.

Figure 5B:
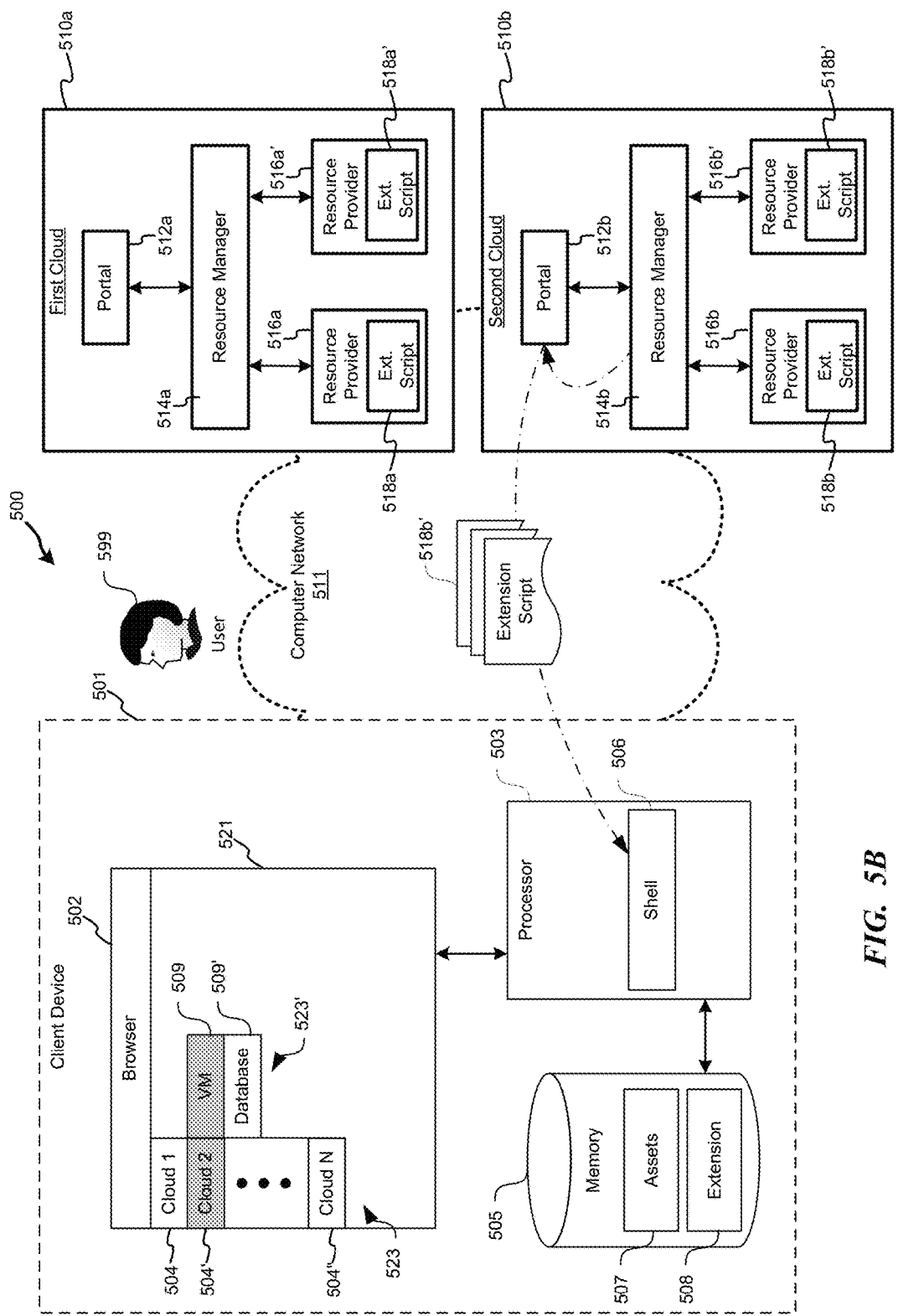
Figure 5C:
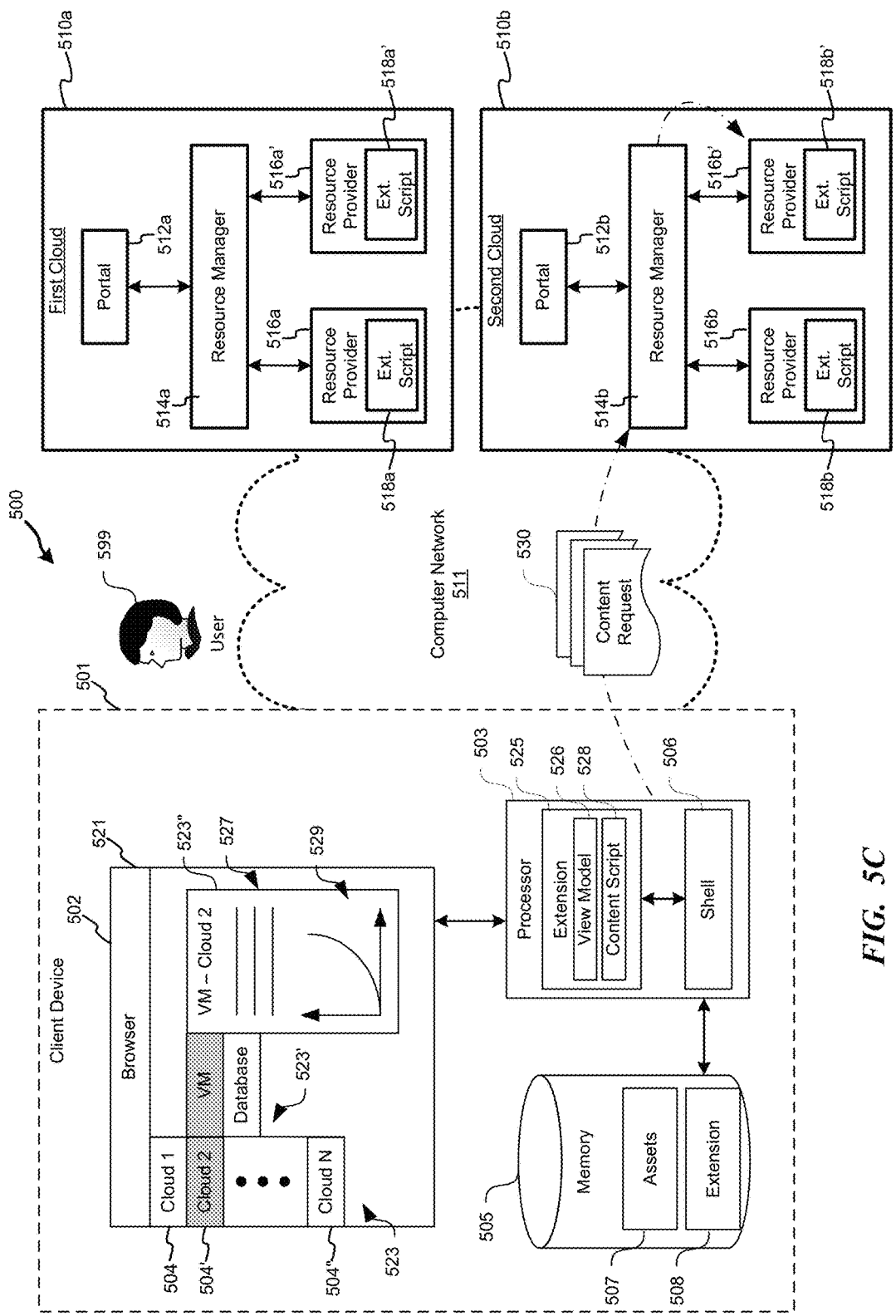

As shown in FIG. 5B, in response to the received access request 522, the resource provider 516b' can provide an associated extension script 518b' to the shell 506 via the resource manager 514b and the portal 512b. The extension script 518' can include instructions that specify both a view model as well as content source(s) related to the VM 509. As shown in FIG. 5C, upon receiving the extension script 518b', the processor 503 can execute the extension script 518b' on top of the shell 506 to provide an extension 525. In certain implementations, the processor 503 can execute the extension script 518b' in an invisible iFrame in the webpage 521. In other implementations, the processor 503 can execute the extension script 518b' in other suitable manners to provide adequate "sandboxing" of the extension 525. In the illustrated embodiment, the extension 525 can include a view model 526 and a content script 528. In other embodiments, the extension 525 can also include other suitable components.

The view model 526 can specify how data related to the VM 509 is to be outputted in the webpage 521. For example, in the illustrated embodiment, the view model 526 indicates that data related to VM 509 is to be outputted in a new blade 523" with certain text 527 and a graph 529. The content script 528 can request the shell 506 to retrieve suitable content to be displayed, for example, as the graph 529 or updates thereof by providing a network location for retrieving the content. In response, the shell 506 can generate and transmit a content request 530 to a suitable content source. In the illustrated embodiment, the content source includes the resource provider 516b'. As such, the shell 506 transmits the content request 530 to the resource manager 514b, which in turn forwards the content request 530 to the resource provider 516'. In other embodiments, the content source can include another website, a network storage, or other suitable types of content source.

Figure 5D:
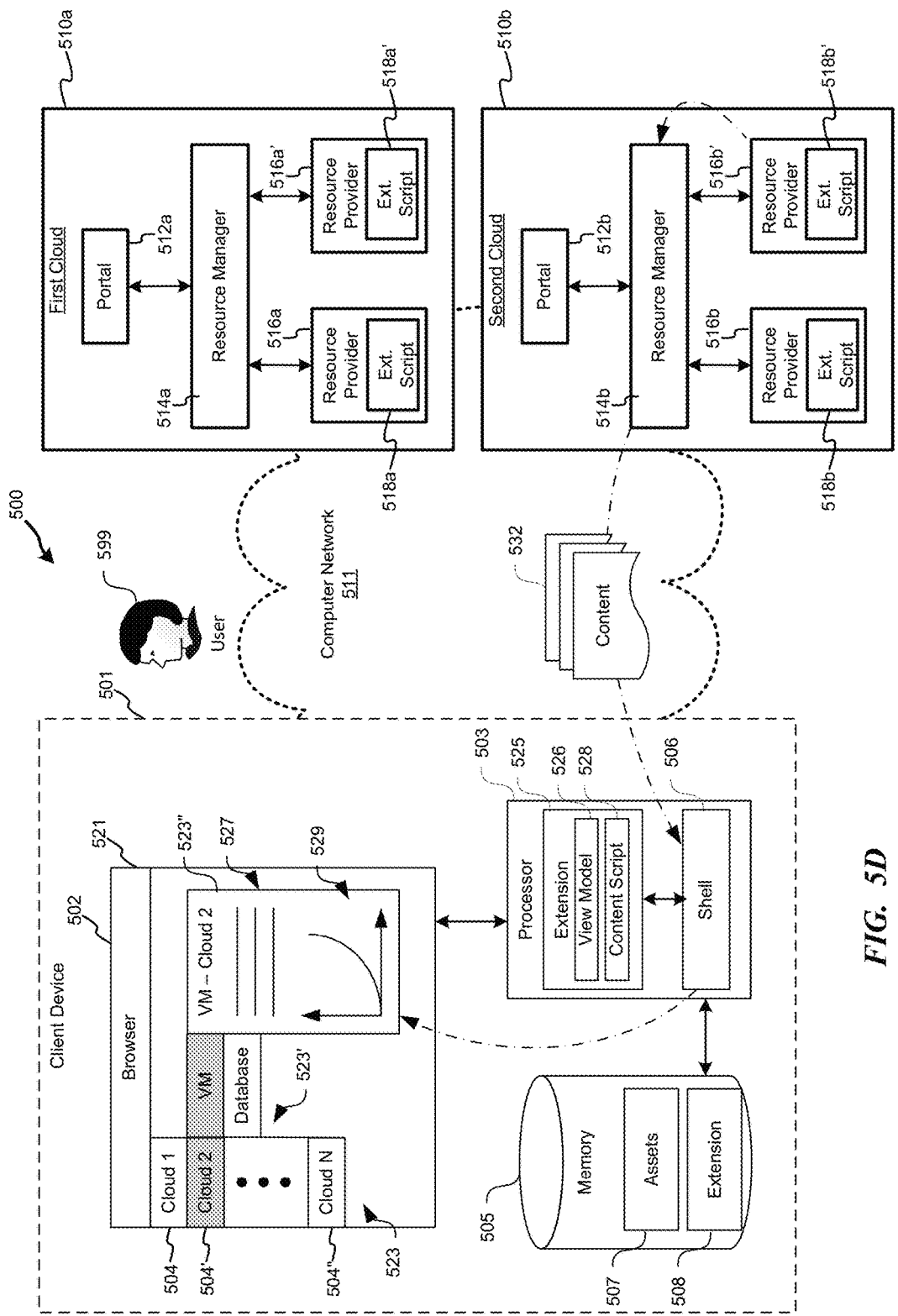

As shown in FIG. 5D, in response to receiving the content request 530 (FIG. 5C), the resource provider 516b' can provide suitable content 532 to the shell 506 via the resource manager 514b'. The content 532 can include, for example, data to be displayed on the graph 529. The shell 506 can then track which extension 525 the received content 532 is related to and forward the received content 532 to the corresponding extension 525, which in turn can display and/or update the graph 529 based on the received content 532.

Figure 5E:
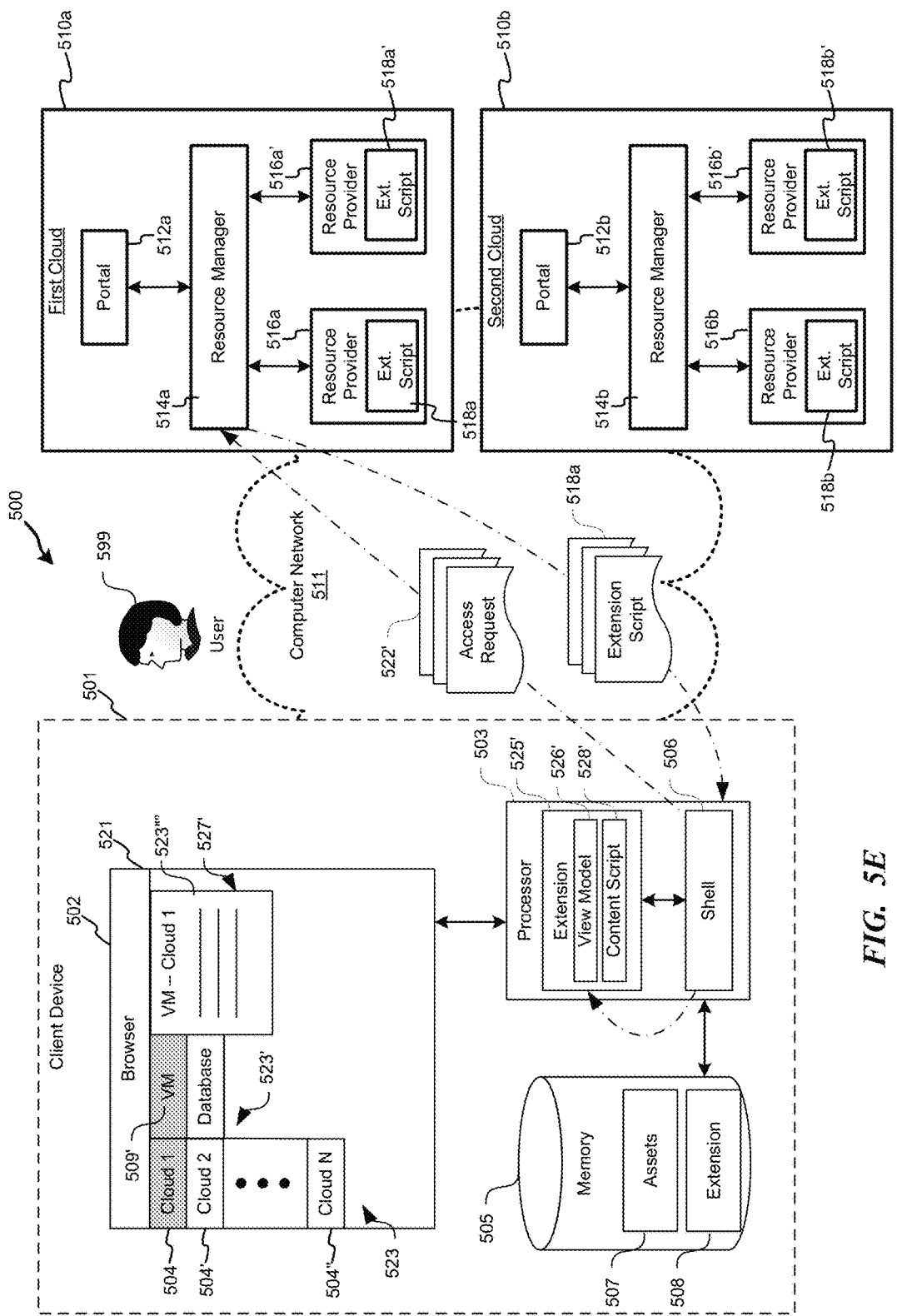

Several embodiments of the computing system 500 can also allow the user 599 to access the first cloud 510a via the same user interface, i.e., the webpage 521, without having to visit another webpage. For example, as shown in FIG. 5E, the processor 503 can detect a further user input from the user 599 to select VM 509' in the blade 523' on the webpage 521. In response, the process 503 can identify that VM 509' is associated with the first cloud 510a. The processor 503 can then retrieve a corresponding extension record 508, and the shell 506 can generate and transmit another access request 522' to the resource manager 514a at the first cloud 510a bypassing the portal 512a. In response, the resource provider 516a at the first cloud 510a can provide an associated extension script 518a to the shell 506 via the resource manager 514a.

Figure 5F:
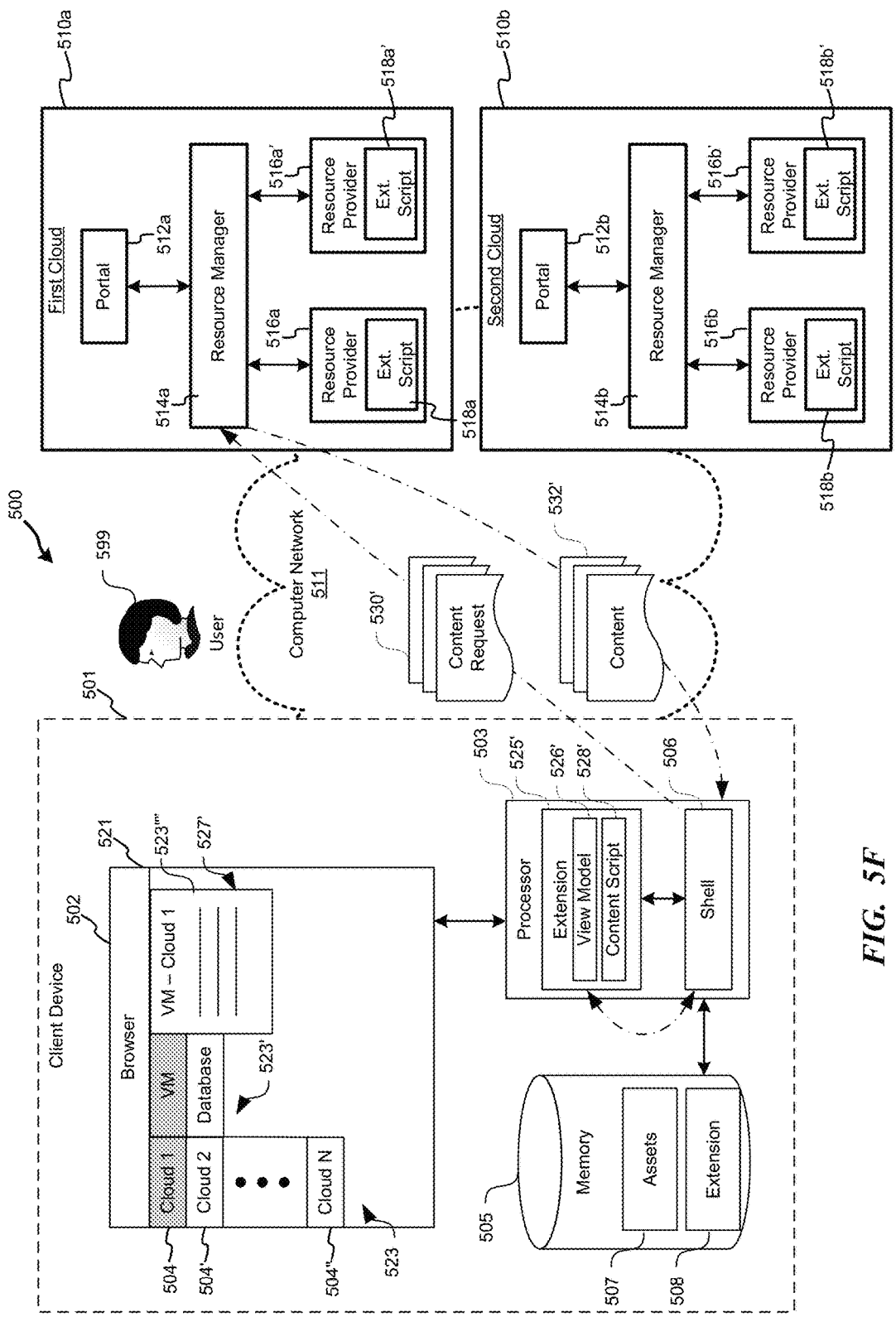

Upon receiving the extension script 518a, the processor 503 can execute the extension script 518a on top of the shell 506 to provide another extension 525' having a view model 526' and a content script 528'. In the illustrated embodiment, the view model 526' can specify that data related to VM 509' can be displayed on the webpage 521 in another blade 523"" and can only include text 527. In other embodiments, the view model 526' can specify the data related to VM 509' be displayed in other suitable manners on the webpage 521. Similar to the operations described with reference to FIGS. 5C and 5D, the shell 506 can also facilitate the content script 528' to retrieve suitable content 532' by transmitting a content request 530', as shown in FIG. 5F.

As described above with reference to FIGS. 5A-5F, several embodiments of the disclosed technology can thus allow the user 599 to access services from different clouds via an integrated user interface, e.g., the webpage 521 without having to switch back and forth between multiple webpages individually for each cloud. Several embodiments of the disclosed technology can also accommodate different versions of services from different clouds by, for example, executing extension scripts 518 in separate invisible iFrames on the webpage 521. As a result, the user 599 is presented with a unified and integrated user interface that shows all services and resources available to the user 599 based on subscriptions of the user 599.

Figure 6A:
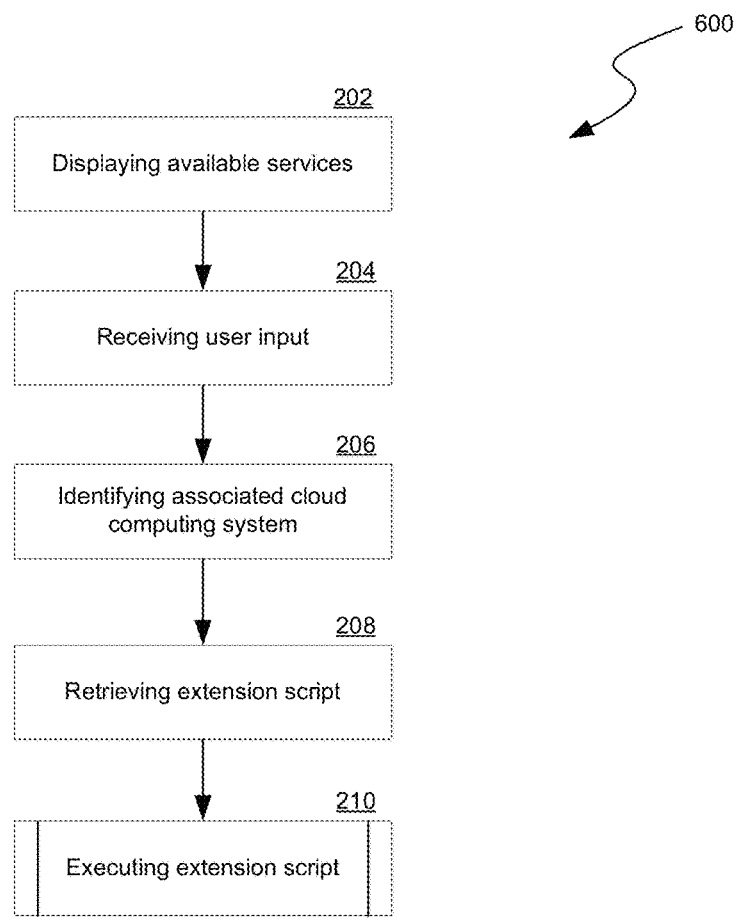
FIGS. 6A and 6B are flowcharts illustrating methods of accessing multiple cloud computing systems via an integrated UI in accordance with embodiments of the disclosed technology.
Figure 6B:
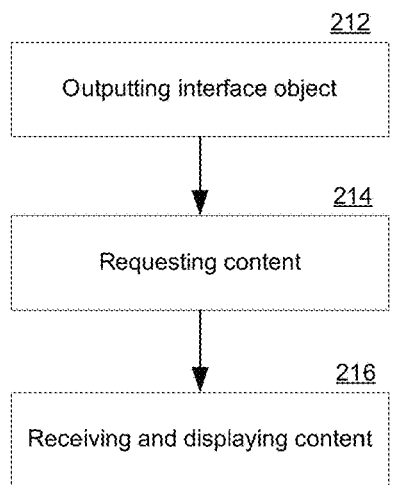

FIGS. 6A and 6B are flowcharts illustrating methods of accessing multiple cloud computing systems via an integrated UI in accordance with embodiments of the disclosed technology. Even though the methods are described below with reference to the computing system 500 in FIGS. 5A-5F, in other embodiments, the methods can be implemented in other suitable computing systems with additional and/or different components.

As shown in FIG. 6A, a process 600 can include displaying available services and resource to a user at stage 202. In certain embodiments, the available services and resources can be determined based on one or more subscriptions of the user to, for example, a public cloud, a private cloud, or a combination thereof. In other embodiments, the available services and resources can be determined based on records of assets available to the user or other suitable information. The process 600 can then include receiving a user input selecting one of the displayed services or resources at stage 204. The process 600 can then include identifying an associated cloud computing system with the selected service at stage 206. In certain embodiments, the cloud computing system can be identified based on a record associating the service with a particular cloud computing system. In other embodiments, the cloud computing system can be identified based on subscriptions of the user or other suitable information.

The process 600 can then include retrieving an extension script associated with the selected service based on the identified cloud computing system at stage 208. In certain embodiments, retrieving the extension script can include transmitting an access request to the cloud computing system and receiving, in return, the extension script. In other embodiments, retrieving the extension script can also include retrieving a cached copy of the extension script from a memory or from other suitable sources. The process 600 can then include executing the retrieved extension script to provide a user interface associated with the selected service at stage 210. Example operations of executing the retrieved extension script are described below with reference to FIG. 6B.

As shown in FIG. 6B, the operations of executing the retrieved extension script can include generating and outputting an interface object based on, for example, a view model included in the retrieved extension script at stage 212. The operations can also include executing a content script included with the extension script to request content from a suitable content source at stage 214. The operations can further include receiving the requested content and displaying the received content on the interface object associated with the selected service at stage 216.

From the foregoing, it can be appreciated that specific embodiments of the disclosure have been described herein for purposes of illustration, but that various modifications can be made without deviating from the disclosure. In addition, many of the elements of one embodiment can be combined with other embodiments in addition to or in lieu of the elements of the other embodiments. Accordingly, the technology is not limited except as by the appended claims.

We claim:

1. A method for providing a user interface on a display of a computing device that allows access to cloud services provided by multiple distinct cloud computing systems via the user interface, the method comprising:
displaying, via the user interface on the display of the computing device, a list of cloud services available to a user based on an identity of the user, the cloud services in the list being provided by the multiple distinct cloud computing systems;
receiving, via the user interface on the display of the computing device, a user input selecting a cloud service from the displayed list of cloud services; and
upon receiving the user input selecting the cloud service,
identifying, at the computing device, a cloud computing system corresponding to the selected cloud service from the multiple distinct cloud computing systems;
transmitting, from the computing device and via a computer network, an access request to the identified cloud computing system for accessing the selected cloud service provided by the identified cloud computing system;
receiving, from the cloud computing system via the computer network, an extension script associated with the selected cloud service, the extension script identifying a view model;
executing, with a processor of the computing device, the retrieved extension script at the computing device; and
surfacing or presenting, on the user interface, an interface object corresponding to the selected cloud service as specified by the view model in the executed extension script.

2. The method of claim 1 wherein displaying the list of cloud services includes:
displaying a webpage in a web browser;
executing a script in the webpage to identify (i) the list of cloud services to the user based on the user's subscriptions to the cloud services and (ii) an interface object associated with the list of cloud services; and
outputting, the list of cloud services in the interface object, as a part of the user interface.

3. The method of claim 1 wherein:
identifying the cloud computing system includes identifying a network address at which the selected cloud service provided by the cloud computing system is accessible; and
transmitting the access request includes transmitting, via the computer network, the access request to the identified network address for accessing the selected cloud service provided by the identified cloud computing system.

4. The method of claim 1 wherein:
the received extension script also includes a content retrieving script; and
the method further includes:
executing the content retrieving script to retrieve content via the computer network; and
outputting the retrieved content on the interface object corresponding to the selected cloud service as specified by the view model in the extension script.

5. The method of claim 1, further comprising:
executing a script associated with a webpage in a web browser to provide the user interface, the executed script providing a shell configured to facilitate execution of extensions;
the received extension script also specifies a content source; and
the method further includes:
generating, at the shell, a request to retrieve content from the content source;
transmitting, via the computer network, the generated request to the content source; and
receiving, from the content source, the requested content in response to the transmitted content request; and
providing the received content to the interface object corresponding to the selected cloud service to be outputted to the user.

6. The method of claim 5 wherein:
generating, at the shell, the request to retrieve content from the content source includes generating, at the shell, an asynchronous JavaScript and XML ("AJAX") call; and
transmitting the generated request includes transmitting, via the computer network, the generated AJAX call to the content source.

7. The method of claim 5, further comprising:
associating the received content with the selected cloud service; and
subsequently, providing the received content to the interface object corresponding to the selected cloud service to be outputted to the user.

8. The method of claim 1 wherein:
the cloud service is a first cloud service;
the cloud computing system is a first cloud computing system;
the interface object is a first interface object;
the method further includes:
receiving, via the same user interface, another user input selecting a second cloud service different than the first cloud service;
in response to receiving the another user input,
identifying a second cloud computing system corresponding to the second cloud service, the second cloud computing system being different than the first cloud computing system;
transmitting, via the computer network, another access request to the second cloud computing system for accessing the second cloud service;
receiving, from the second cloud computing system via the computer network, another extension script associated with the second cloud service, the another extension script identifying another view model different than the view model associated with the first cloud service; and
executing the received another extension script with the processor of the computing device and updating the user interface to display another interface object corresponding to the second cloud service as specified by the executed another view model without switching the user interface.

9. The method of claim 1 wherein:
the cloud service is a first cloud service;

the cloud computing system is a first cloud computing system;

the interface object is a first interface object;

the user interface includes a webpage on a web browser; and the method further includes:

receiving, via the webpage, another user input selecting a second cloud service different from the first cloud service;

in response to receiving the another user input, identifying a second cloud computing system corresponding to the second cloud service;

transmitting, via the computer network, another access request to the second cloud computing system for accessing the second cloud service;

receiving, from the second cloud computing system, another extension script associated with the second cloud service, the another extension script identifying another view model different than the view model associated with the first cloud service; and executing the received another extension script with the processor of the computing device and outputting, on the same webpage in the web browser, another interface object corresponding to the second cloud service as specified by the executed another view model without switching to a new webpage in the web browser.

10. A computing system for providing a user interface that allows access to cloud services provided by multiple distinct cloud via the same user interface, the computing system comprising:

a processor;

a display operatively coupled to the processor; and a memory coupled to the processor, the memory containing instructions executable by the processor to cause the processor to perform a process comprising:

outputting, on the display, a webpage in a web browser;

receiving, via a webpage in a browser, a user input selecting a cloud service; and in response to receiving the user input selecting the cloud service, determining a cloud computing system associated with the selected cloud service from the multiple distinct cloud computing systems;

transmitting, from the computing system and via a computer network, an access request to the determined cloud computing system for accessing the selected cloud service provided by the determined cloud computing system;

retrieving, from the determined cloud computing system associated with the selected cloud service, an extension script specifying a view model and provided by the cloud computing system in response to the transmitted access request; and executing the retrieved extension script at the computing system to surface or render an interface object corresponding to the selected cloud service as specified by the view model in the extension script.

11. The computing system of claim 10 wherein the process performed by the processor further includes:

executing a shell script to provide a shell configured to allow execution of one or more extension scripts; and executing the retrieved extension script includes executing the retrieved extension script on top of the shell to render the interface object corresponding to the selected cloud service in the webpage as specified by the view model in the extension script.

12. The computing system of claim 10 wherein determining the cloud computing system associated with the selected cloud service includes determining cloud computing system associated with the selected cloud service based on a record in an extension table, the record including data indicating a name, an associated cloud computing system, and a universal resource locator ("URL") at which the cloud service is accessible.

13. The computing system of claim 12 wherein retrieving the extension script includes retrieving the extension script based on the URL associated with the selected cloud service.

14. The computing system of claim 10 wherein:

the view model specifies at least one of more of an interface object type, a format, or a size of the interface object; and executing the retrieved extension script includes executing, within the webpage, the retrieved extension script to render the interface object based on the at least one of more of an interface object type, a format, or a size of the interface object specified by the view model.

15. The computing system of claim 10 wherein executing the retrieved extension script includes:

executing the retrieved extension script to provide an extension associated with selected cloud service;

receiving, at the shell, a request for retrieving network content from the extension;

retrieving the requested network content based on the received request; and providing the retrieved network content to the extension to be outputted on the interface object associated with the selected cloud service.

16. The computing system of claim 10 wherein executing the retrieved extension script includes:

executing the retrieved extension script in an iFrame of the webpage to provide an extension associated with selected cloud service, the iFrame being invisible on the webpage;

receiving, at the shell, a request for retrieving network content from the extension;

retrieving the requested network content based on the received request; and providing, via the invisible iFrame, the retrieved network content to the extension to be outputted on the interface object associated with the selected cloud service.

17. A computing device for providing a user interface that allows a user to access cloud services provided by both a private cloud and a public cloud, the computing system comprising:

a processor;

a display operatively coupled to the processor; and a memory coupled to the processor, the memory containing instructions executable by the processor to cause the processor to perform a process comprising:

outputting, on the display, a webpage in a web browser;

receiving, via user interface on the display, a user input selecting a first cloud service and a second cloud service; and in response to receiving the user input selecting the first and second cloud services, determining the first cloud service is provided by the private cloud and the second cloud service is provided by the public cloud;

transmitting, from the computing device, an access request to each of the private cloud and public cloud for accessing the selected first and second cloud services provided by the private cloud and public cloud, respectively;

retrieving, from the private cloud and the public cloud in response to the transmitted access requests, a first extension script and a second extension script, respectively, the first and second extension scripts specifying a first view model and a second view model, respectively; and executing the received first and second extension scripts with the processor and surfacing or rendering, on the same user interface, first and second interface objects corresponding to the selected first and second cloud service as specified by the first and second view models in the retrieved and executed first and second extension scripts, respectively.

18. The computing device of claim 17 wherein the process performed by the processor further includes:

in response to receiving the user input selecting the first and second cloud services, identifying a first network address at which the selected first cloud service provided by the private cloud is accessible;

identifying a second network address at which the selected second cloud service provided by the public cloud is accessible; and retrieving the first and second extension scripts includes retrieving the first and second extension scripts based on the first and second network addresses of the private and public clouds, respectively.

19. The computing device of claim 17 wherein:

the received first and second extension scripts also include a content retrieving instructions; and the method further includes:

executing the content retrieving instructions in the first and second extension scripts to independently retrieve content; and providing the retrieved content to the first and second interface objects corresponding to the selected first and second cloud services, respectively, for outputting on the display.

20. The computing device of claim 17 wherein the process performed by the processor further includes:

determining a list of cloud services available to the user based on an identity of the user;

outputting the determined list of cloud services on the display; and wherein receiving the user input includes receiving, via user interface on the display, the user input selecting the first cloud service and the second cloud service from the outputted list of cloud services.

* * * * *